Figure 1:
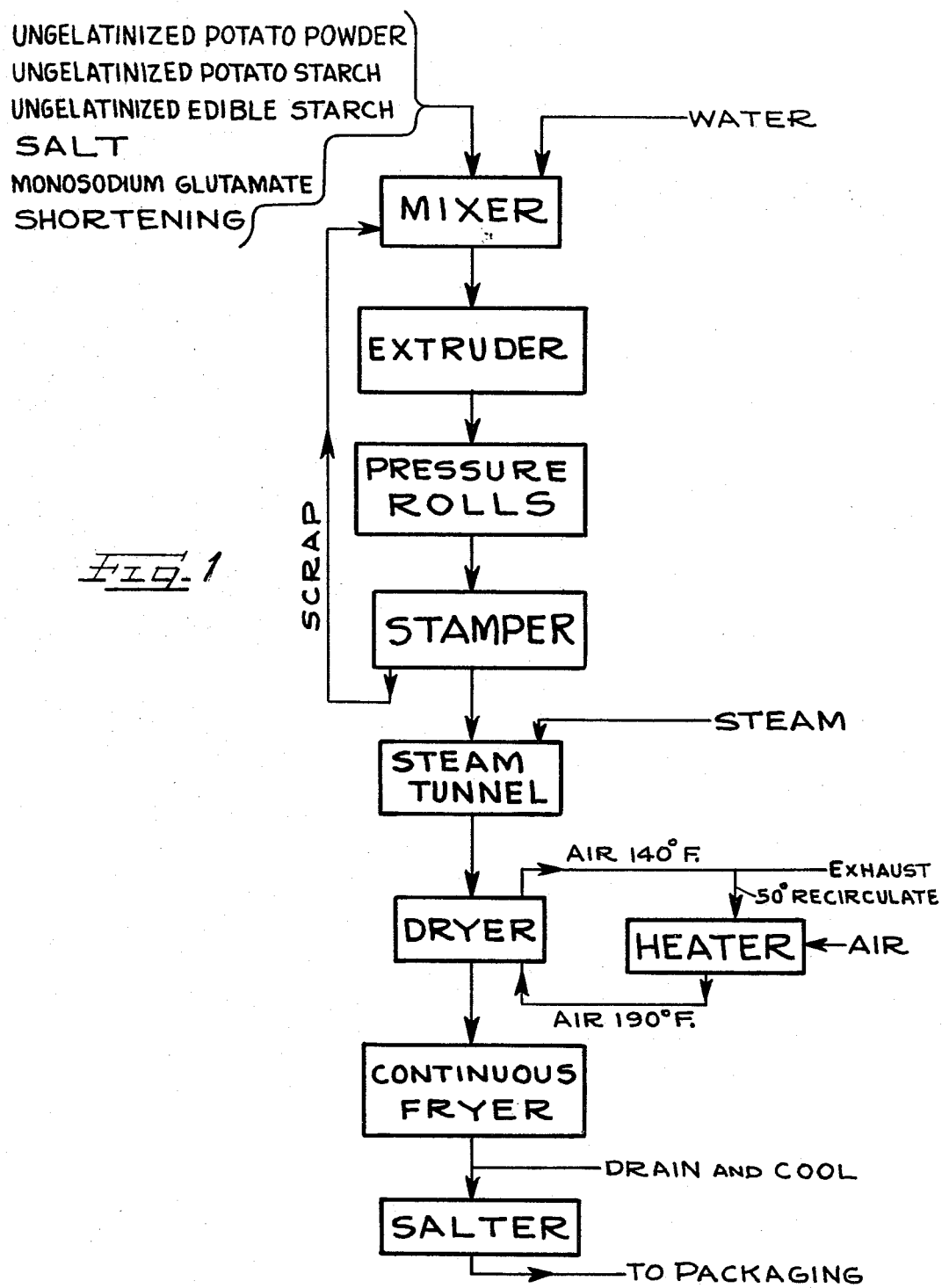

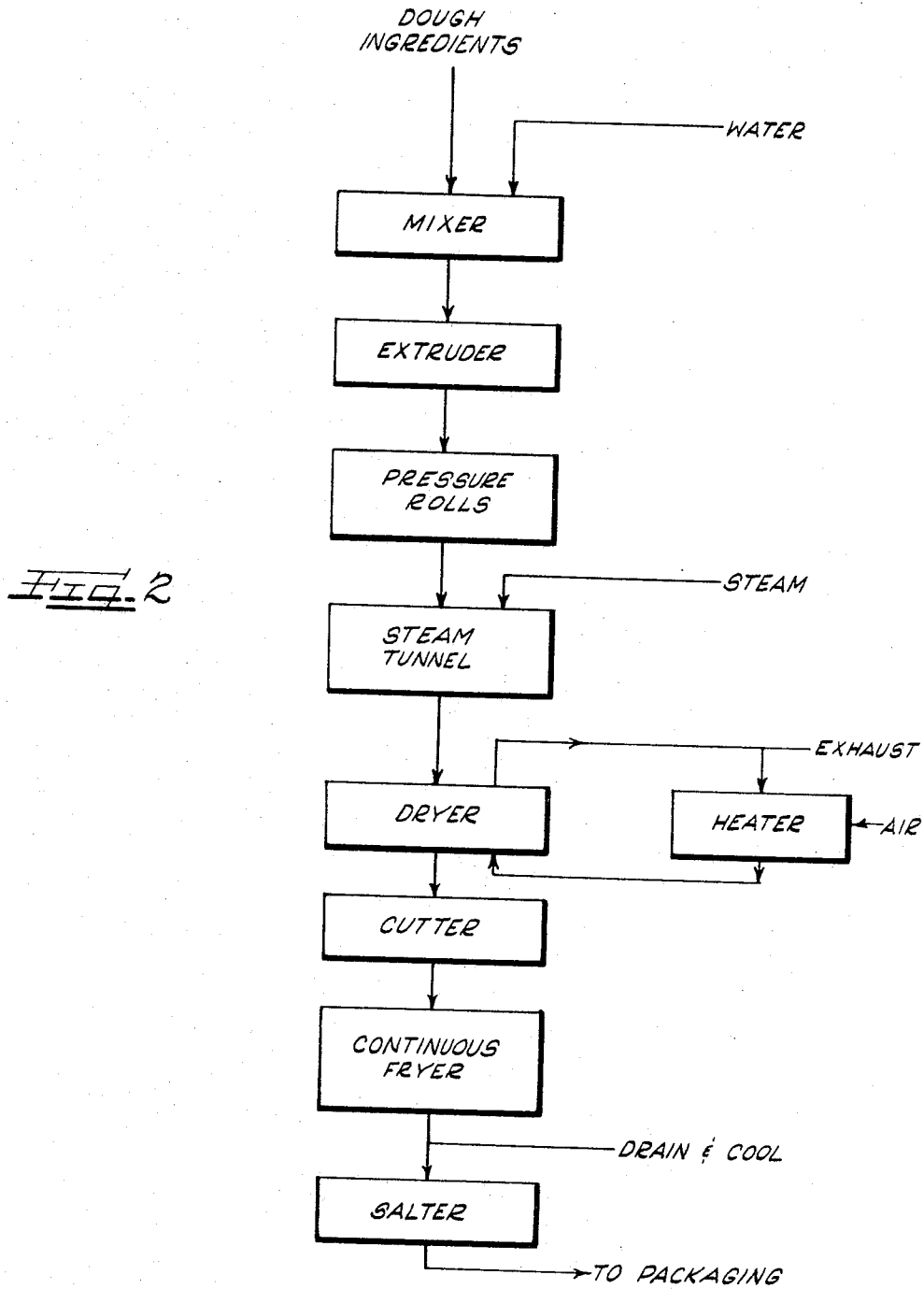

3,297,450
METHOD OF PRODUCING POTATO CHIPS
Stephen J. Loska, Jr., Des Plaines, Ill., assignor to National Dairy Products Corporation, New York, N.Y., a corporation of Delaware
Filed Apr. 20, 1966, Ser. No. 549,745
6 Claims. (Cl. 99—100)

This application is a continuation-in-part of my copending application Serial No. 251,936 filed January 16, 1963, now abandoned, entitled, "Method of Producing Potato Chips."

The present invention relates to food products prepared from potatoes, and more particularly, it relates to a method of manufacturing a dough product which can be fried to provide a crisp potato chip.

Potato chips have long been prepared by deep-fat frying suitably prepared slices of raw potatoes. Production of potato chips from raw potatoes poses problems in the procurement and storage of raw potatoes. In this connection, not all potatoes can be used to manufacture desirable potato chips, and raw potatoes are difficult to store for extended periods. In the latter connection, considerable research work has been done to determine ways of increasing the storage life of raw potatoes, but such work has not greatly increased the storage period nor has it alleviated the problems inherent in handling raw potatoes.

Various attempts have been made to produce potato chips from mixtures of ingredients corresponding generally to the constituents of raw potatoes. Successful production of potato chips in this manner would, of course, reduce the general problems in procurement and storage of raw potatoes. However, these attempts have not resulted in the production of a potato chip having the desirable qualities of chips produced from raw potatoes. Moreover, these processes have not provided potato chips which will maintain desired taste characteristics over storage periods.

It is a principal object of the present invention to provide an improved potato product which in fried form provides a potato chip. Another object of the invention is to provide potato products which can be stored for extended periods of time and then made into potato chips. A more particular object is to provide a method of manufacturing potato chips from dry ingredients which chips have improved taste-stability. Other objects and advantages of the present invention will become apparent from the following description when read in conjunction with the accompanying drawings wherein:

FIGURE 1 is a flow diagram of a process embodying various features of the invention; and FIGURE 2 is a flow diagram of another embodiment of a process embodying various features of the invention.

Generally, in accordance with the teachings of the present invention, there is provided a method for manufacturing potato chips from a mixture of ungelatinized, ground, vegetable and cereal ingredients. A dough is first produced by blending these ingredients and water, and the dough is then formed into an elastic ribbon. The dough ribbon is then cut into appropriate chip-sized pieces, steamed to gelatinize the dough constituents, and the pieces are then dried. The dried pieces may then be immediately deep-fat fried to produce crisp potato chips having improved taste-stability. Alternately, the dried pieces may be stored for extended periods or shipped to other locations for frying.

More particularly, as illustrated diagramatically in FIGURE 1, a dough is produced having suitable elastic qualities which enables it to be later satisfactorily worked to produce potato chips. The ingredients used to formulate the dough are substantially ungelatinized, for it has been found that a dough mass prepared from a dry mix which includes a major portion of ungelatinized ground dehydrated potato has a consistency that enables it to be worked into a tough, elastic sheet. The resultant sheet has sufficient strength to allow it to be manipulated and transported in commercial dough-handling equipment even though the sheet is of minimum thickness. Working of the dough mass into a sheet may be accomplished by at least two methods: extruding the dough mass through a restricted orifice or repeatedly passing the dough mass through pressure rolls. Final sizing of the worked dough mass into a sheet of desired thickness may then be accomplished by passage through one or more sets of calibrating rolls.

In this connection, "gelatinization" of starch is known to those skilled in the art as a change in the structure of starch granules which occurs when the starch is heated in the presence of water. Provided that sufficient water is present, the initially insoluble starch granules swell to form a viscous solution or dispersion. However, gelatinization temperatures are not fixed, but extend over a range of temperatures like that in the melting of amorphous materials such as tar. The extent of gelatinization is dependent on several factors, including the water content of the starch (United States Letters Patent No. 3,236,654) and the type of starch (Sullivan and Johnson, "Measurement of Starch Gelatinization by Enzyme Susceptibility," Cereal Chemistry, volume 41, No. 2, March 1964). One of the first changes occurring during gelatinization is loss of birefringence (the dark cross pattern shown by raw starch granules when viewed through a polarizing microscope).

Loss of birefringence has been suggested as the test for "gelatinization" of starch. However, as pointed out above, loss of birefringence is one of the first changes during gelatinization, and a starch which does not exhibit birefringence is not necessarily "gelatinized" as the word is used herein.

The dough is made by blending a mixture of the ungelatinized, ground, vegetable and cereal ingredients with an appropriate amount of water. The dry mix includes a major portion of ground dehydrated potato powder in an amount between about 50% and 90%. Whenever used in this application, the term "percent" is to be understood to mean percent by weight. A preferred level of the potato powder is about 85% of the dry mix.

Potato starch is present with the potato powder in an amount from about 3.5% to about 43% of the total dry mix. The amount of potato starch used is generally dependent upon the amount of dried potato powder used. Less potato starch than potato powder should be used in the dry mix. The total amount of potato powder and potato starch should constitute about 90% of the dry mix.

In accordance with a particular embodiment of the invention, an ungelatinized edible cereal or vegetable starch other than potato starch is also included in the dry mix. The ungelatinized edible cereal or vegetable starch makes up about 2% to about 6% of the dry mix. Examples of suitable starches include sweet rice flour, rice starch, rice flour, tapioca starch, tapioca flour and corn starch. Preferably, sweet rice flour is used at a level of about 4% of the dry mix.

Shortening and salts make up the remainder of the dry mix. The shortening is present at a level of about 2.5% of the dry mix, and the salts make up about 2% of the dry mix. Although the mixture includes shortening and ingredients with slight amounts of moisture, it is herein referred to as the "dry mix," as distinguished from the product resulting after water is added thereto, which product is referred to as "dough."

As previously indicated, it is important that the starch and powder ingredients which go into the dry mix are ungelatinized materials. Of course, the use of minor amounts of materials which have been gelatinized will not affect the improved product. However, the use of materials that have been gelatinized to any substantial extent or the use of substantial amounts of gelatinized materials does not provide a dough having the desired elastic properties nor the physical properties to enable it to be processed through sheet-forming or cutting equipment but instead results in a dough which has unsatisfactory extrusion characteristics which may not be formed into a satisfactory continuous thin ribbon of dough. Accordingly, both the potato starch and the edible vegetable or cereal starch, if the latter is utilized, are selected from materials which are substantially ungelatinized, and the potato powder has no substantial gelatinization of the starch therein.

Potato powder, suitable for use in the dry mix, can be produced in any suitable manner, well known in the art of potato dehydration. Dehydration should be effected at temperatures which do not cause any substantial gelatinization of the potato constituents.

One example of a suitable method of preparation of potato powder comprises first peeling and washing whole raw potatoes. The peeled potatoes are then blanched, the blanching being performed in a manner which creates no substantial starch gelatinization. The potatoes are diced. Optionally, the potatoes may be treated with bisulfite and/or calcium solutions. The diced pieces are dried to a relatively low moisture content, preferably to about 7% moisture. Conditions of temperature, time and moisture level during blanching and drying may be such as to cause loss of birefringence of the powder, but not such as to cause gelatinization, as that term is used herein. The dried, diced pieces are then ground in a mill to provide a suitable potato powder for the dry mix. Preferably, the powder is ground to a particle size that will pass through a U.S. Standard No. 40 sieve.

The dough is prepared by first distributing the shortening, melting it if necessary, throughout the dry ingredients and then adding water in a mixer of the pug mill, paddle or ribbon type. The exact amount of water is determined by the handling characteristics of the dough. However, generally enough water is added so that the resultant dough comprises from about 35% to about 60% moisture.

The selected dry ingredients easily mix with the water in the mixer. Mixing is continued until the dough obtains a loose lump consistency. Batches of dough in which precoked or gelatinized starches or potatoes are substituted for the ungelatinized materials specified above, when mixed with corresponding amounts of water, do not readily produce dough having a loose lump consistency. The use of water in proportions greater than indicated above is undesirable. Because excess water must later be evaporated to produce a suitable moisture content for frying, it is desirable that the moisture content of the dough be minimized. In accordance with the present invention, this desirable result is achieved.

The dough is then conveyed to a suitable food extruder. The extruder is preferably one of the screw-type which comprises a cylinder in which is disposed a rotatable screw. The extruder also includes an orifice through which the dough is forced by the screw. In the cylinder the dough undergoes sufficient working by the screw so that, during its passage through the extruder, the dough is made homogeneous, is properly hydrated and develops the desired elasticity. The orifice preferably comprises an extrusion die having an annular die opening so that the dough is extruded as a thin-walled hollow cylinder, although other die configurations are considered suitable, such as those capable of extruding the dough as a flat sheet. The die opening should be about 0.025 inch so that the walls of the extruded dough cylinder have the desired thickness. The dough cylinder is slit to form a flat sheet or ribbon of dough material from which the dough blanks or pieces for individual chips will be formed.

As before indicated, to provide a dough having suitable characteristics, it is important that the ingredients should be ungelatinized. The use of gelatinized materials in the dough results in a dough which does not provide the desired dough ribbon.

The elasticity of the dough made in accordance with the teachings of the present invention is such that, after leaving the die, the thickness of the dough expands to about twice that of the die opening. This characteristic of expansion may be indicative of a dough's suitability for this process.

The ribbon of dough is next fed between pressure rolls to further work the dough and to reduce it to the desired thickness for frying to a suitable chip. Depending upon the thickness of the extruded ribbon, one or more sets of rolls may be used to obtain the desired reduction in thickness.

After the dough ribbon has been rolled to the desired thickness, it is cut or stamped to provide blanks suitable for the final manufacture of chips. Cutters or stamping machines which are well known in the cookie industry may be suitably modified for carrying out this operation.

The blanks from the stamping operation are deposited upon an endless belt which carries them to the next operation. The scraps from the stamping operation are fed back into the mixer.

The endless belt carries the chip blanks through a steaming operation in which the starch constituents of the blanks are gelatinized. In this connection, the steam provides sufficient moisture and temperature to effect gelatinization of the product, as used herein. A mesh belt is preferably employed so that both the upper and lower surfaces of the dough blanks can be simultaneously steamed in order to carry out the steaming operation as quickly as possible. The belt may be made of any suitable material which is suitable for use with food products, such as woven wire cloth of stainless steel. It has been found that by directing steam at atmospheric pressure at the blanks for about 2 to 8 minutes, gelatinization of substantially all the starch in the dough is effected.

After the steaming operation, the blanks are dried to the desired moisture level for frying. Drying may be carried out in a suitable manner. For example, forced air drying with air at about 140–260° F. is suitable. Determination of a proper moisture level is well known within the skill of the art. A moisture level of about 14% or less of the total weight of the moist dough blanks is necessary for effecting satisfactory storage, and once the dough blanks have been dried, they may be stored for extended periods of time before frying. They may also be shipped to different locations for frying at such locations. Thus, a substantial advantage is provided over the use of raw potatoes by permitting extended storage times, and problems attendant to handling raw potatoes are avoided.

The gelatinized, dried dough blanks are fried in deep fat to produce potato chips of desired crispness and color. Any of the well known methods and materials for frying potato chips and the like can be employed, although shorter frying times and some means for maintaining the blanks submerged in the fat should be utilized. Preferably, a continuous fryer is used with fat held at a cooking temperature of about 365° F. At this temperature, immersion in the fat for a period of about 10–20 seconds is sufficient to produce a chip of desired crispness and color.

Upon removal from the fryer, the potato chips are drained, cooled and dusted with salt. The resultant chips have a delicious flavor.

Frying the dough blanks produces an expansion in thickness by the creation of numerous small voids distributed generally uniformly throughout the body of the chip. In this respect, it has been found that dough blanks having a thickness of approximately 0.025 inch expand, when fried, to produce a chip with an average thickness of about 0.100 inch.

EXAMPLE

As an example of the practice of the present invention, a dough was prepared by blending 15 pounds of water in a pug mill with a dry mix containing ingredients in the amounts set forth in the following table:

*Table I*

| | Pounds |
|---|---|
| Ungelatinized potato powder (7% moisture) | 17.3 |
| Ungelatinized potato starch | 1.0 |
| Ungelatinized sweet rice flour | 0.8 |
| Salt (sodium chloride) | 0.3 |
| Monosodium glutamate | 0.1 |
| Shortening | 0.5 |
| | 20.0 |

The foregoing constituents were blended to produce a dough with a loose lump consistency.

The dough was transferred to screw-type food extruder wherein it was forced through a die to form a thin-walled continuous cylinder of dough. The annular die opening had a uniform thickness of 0.025 inch and was blocked at its uppermost point to slit the cylinder as it emerged from the die. The dough cylinder was then opened out into a flat ribbon as it moved away from the die. The ribbon of dough was elastic in character and had a thickness of about .050 inch.

The dough ribbon was then passed through pressure rolls to reduce the thickness for frying. Upon exit from the rolls, the dough ribbon had a thickness of about 0.025 inch. The rolled dough ribbon was next fed through a modified walking cookie cutter to produce dough blanks. The blanks from the cutter were transferred to a moving wire mesh belt. The scraps from the cutter were collected and returned to the pug mill to provide additional raw material.

An endless wire mesh belt carried the blanks through a two section tunnel, comprising a steaming section and a drying section. In the steaming section, the dough blanks were subjected to steam at atmospheric pressure to effect gelatinization of the starch. Steam was directed onto both the tops and bottoms of the dough blanks through orifices spaced throughout the length of this section. The steaming section was 9 feet long, and the linear speed of the endless belt was about 24 inches per minute. Thus, the dough blanks were exposed to steam for about 4½ minutes.

In the drying section of the tunnel, the gelatinized blanks were dried to 14 percent moisture. The drying was effected in about 12 minutes and was effected by a counter-current circulation of hot air. The inlet air entered at 1000 cubic feet per minute and at a temperature of 190° F. The outlet air temperature was 170° F. One-half of the outlet air flow was exhausted and the other half of the flow was returned to a heater for recirculation through the drying section.

The gelatinized, dried, dough blanks were then conducted to a continuous fryer wherein they were fried in fat at a temperature of about 365° F. for a period of about 15 seconds. They were then removed, drained, cooled and salted.

The resultant potato chips had a delicious flavor, and they had numerous small voids distributed throughout. The strength of the chips was sufficient to undergo shipping without excessive breakage, but was sufficiently tender for desirable eating characteristics. After storage under conditions approximating packaging for retail marketing, the potato chips were found to retain desirable eating qualities for a period of time substantially longer than potato chips produced by the usual methods of manufacture from raw potatoes.

In FIGURE 2 there is illustrated another method of producing potato chips which incorporates the method of the present invention. The method is, generally, in accordance with the method of FIGURE 1 except that following extrusion of the dough to form a ribbon, the ribbon is conducted directly into the steam tunnel. Thus, a continuous dough ribbon is treated in the steam tunnel and dryer, instead of dough blanks. This is advantageous in obtaining optimum contact of the extruded dough ribbon with steam, and subsequently with drying air. It is further advantageous in ease of separating the dough ribbon from the belt.

Thereafter, after discharge of the dough ribbon from the dryer, the ribbon is cut into individual potato chip-size pieces in a cutter, and the pieces are then fried as previously described. The cutter is desirably designed so that no scrap is left from the cutting operation.

Thus, there has been provided a process for making a potato chip from dry ingredients which has improved characteristics. The process involves the use of readily available raw materials and low amounts of water, thereby lessening later evaporation before frying. Thus, the process can be economically practiced.

Moreover, the invention provides a dough that can be made into blanks which can be dried and stored for extended periods of time and for periods substantially greater than raw potatoes when stored under the same conditions. This feature allows the chip blanks to be produced at a central plant and shipped to other locations where the blanks can be fried to potato chips in conventional equipment for local distribution. Thus, fresh, crisp potato chips can be readily distributed locally.

Various of the features of the invention are set forth in the following claims.

What is claimed is:

1. In a method of producing a potato chip, the steps comprising blending a mixture comprising a major portion of ungelatinized potato powder and a minor portion of ungelatinized potato starch with water to provide a dough, forming said dough into a ribbon, subjecting said dough ribbon to steam and heat for a period of time sufficient to gelatinize the starch constituents in said dough, and drying said steamed dough.

2. The method of claim 1 in which said dough ribbon is rolled to decrease the thickness thereof and to improve the texture thereof and in which the dried dough is fried to provide a crisp potato chip.

3. The method of claim 2 in which another ungelatinized edible starch selected from the class consisting of rice, tapioca, and corn starches is blended with ungelatinized potato powder, said ungelatinized potato starch, and water.

4. The method of claim 2 in which said mixture comprises between about 50% and about 90% ungelatinized potato powder and between about 3.5% and about 43% ungelatinized potato starch.

5. The method of claim 4 in which said mixture further comprises between about 2% and about 6% of another ungelatinized edible starch selected from the class consisting of rice, tapioca, and corn starches.

6. The method of claim 5 in which said mixture comprises about 86% ungelatinized potato powder, about 5% ungelatinized potato starch, and about 4% ungelatinized sweet rice flour.

References Cited by the Examiner

UNITED STATES PATENTS

| 2,791,508 | 5/1957 | Rivoche | 99—100 X |
| 2,856,295 | 10/1958 | Scharf | 99—182 |
| 3,076,711 | 2/1963 | Gerkens | 99—100 |

A. LOUIS MONACELL, *Primary Examiner.*

L. M. SHAPIRO, *Assistant Examiner.*